(12) United States Patent
Noguchi et al.

(10) Patent No.: US 11,547,968 B2
(45) Date of Patent: Jan. 10, 2023

(54) GAS SEPARATION METHOD AND GAS SEPARATION MEMBRANE

(71) Applicants: TOKYO OHKA KOGYO CO., LTD., Kanagawa (JP); NanoMembrane Technologies, Inc., Fukuoka (JP)

(72) Inventors: Takuya Noguchi, Kanagawa (JP); Takahiro Senzaki, Kanagawa (JP); Toshiyuki Ogata, Kawasaki (JP); Toyoki Kunitake, Fukuoka (JP); Shigenori Fujikawa, Fukuoka (JP); Miho Ariyoshi, Fukuoka (JP)

(73) Assignees: TOKYO OHKA KOGYO CO., LTD., Kanagawa (JP); NANOMEMBRANE TECHNOLOGIES, INC., Fukuoka (JP)

(*) Notice: Subject to any disclaimer, the term of this patent is extended or adjusted under 35 U.S.C. 154(b) by 222 days.

(21) Appl. No.: 16/639,809

(22) PCT Filed: Aug. 3, 2018

(86) PCT No.: PCT/JP2018/029302
§ 371 (c)(1),
(2) Date: Feb. 18, 2020

(87) PCT Pub. No.: WO2019/039242
PCT Pub. Date: Feb. 28, 2019

(65) Prior Publication Data
US 2021/0362091 A1 Nov. 25, 2021

(30) Foreign Application Priority Data

Aug. 21, 2017 (JP) ............................. JP2017-158896

(51) Int. Cl.
| B01D 53/22 | (2006.01) |
| B01D 69/02 | (2006.01) |
| B01D 69/06 | (2006.01) |
| B01D 69/10 | (2006.01) |
| B01D 71/70 | (2006.01) |

(52) U.S. Cl.
CPC ........... B01D 53/228 (2013.01); B01D 69/02 (2013.01); B01D 69/06 (2013.01); B01D 69/10 (2013.01); B01D 71/70 (2013.01); B01D 2256/22 (2013.01); B01D 2325/04 (2013.01); B01D 2325/20 (2013.01)

(58) Field of Classification Search
CPC ...... B01D 53/228; B01D 69/02; B01D 69/06; B01D 69/10; B01D 71/70; B01D 2256/22; B01D 2325/04; B01D 2325/20
See application file for complete search history.

(56) References Cited

U.S. PATENT DOCUMENTS

| 3,256,675 | A | * | 6/1966 | Robb | ..................... | B01D 71/70 95/53 |
| 3,325,330 | A | * | 6/1967 | Robb | ................. | B32B 38/0012 156/229 |
| 3,335,545 | A | * | 8/1967 | Robb | ................... | B01D 53/228 95/44 |
| 3,396,510 | A | * | 8/1968 | Ward, III | ............... | B01D 61/38 95/44 |
| 3,447,286 | A | * | 6/1969 | Dounoucos | .......... | B01D 63/087 95/44 |
| 3,510,387 | A | * | 5/1970 | Robb | ..................... | B01D 69/12 428/137 |
| 3,614,855 | A | * | 10/1971 | Luik | .................. | G01N 33/0006 95/47 |
| 3,619,986 | A | * | 11/1971 | Duez | ........................ | G01N 7/10 96/7 |
| 3,676,220 | A | * | 7/1972 | Ward | ..................... | H01M 8/20 204/277 |
| 3,729,400 | A | * | 4/1973 | Ward | ..................... | B01D 61/38 205/464 |
| 2010/0132559 | A1 | * | 6/2010 | Ishida | ..................... | B60R 13/08 96/5 |
| 2014/0165838 | A1 |   | 6/2014 | Suzuki et al. | | |
| 2015/0000519 | A1 | * | 1/2015 | Liu | ...................... | B01D 53/228 95/45 |
| 2015/0090118 | A1 | * | 4/2015 | Liu | ..................... | C08G 73/1039 95/47 |
| 2015/0093510 | A1 | * | 4/2015 | Liu | ..................... | C08G 73/1067 427/316 |
| 2015/0375176 | A1 |   | 12/2015 | Noguchi et al. | | |

(Continued)

FOREIGN PATENT DOCUMENTS

| JP | 2010-240622 | 10/2010 |
| JP | 2013-13887 | 1/2013 |

(Continued)

OTHER PUBLICATIONS

Firpo et al., "Permeability thickness dependence of polydimethylsiloxane (PDMS) membranes", Journal of Membrane Science, May 1, 2015, vol. 481, pp. 1-8, XP055751659.

(Continued)

Primary Examiner — Anthony R Shumate
(74) Attorney, Agent, or Firm — Wenderoth, Lind & Ponack, L.L.P.

(57) ABSTRACT

The present invention provides: a gas separation method which is capable of desirably separating a slight amount of a component from a mixed gas under mild conditions such that the pressure difference between both sides of a gas separation membrane is 1 atmosphere or less; and a gas separation membrane which is suitable for use in this gas separation method. According to the present invention, in a gas separation method wherein a specific gas (A) in a mixed gas, which contains the specific gas (A) at a concentration of 1,000 ppm by mass or less, is selectively permeated with use of a gas separation membrane, an extremely thin gas separation membrane that has a film thickness of 1 µm or less is used, so that the gas (A) is desirably separated under mild conditions such that the pressure difference between both sides of the gas separation membrane is 1 atmosphere or less.

9 Claims, No Drawings

(56) References Cited

U.S. PATENT DOCUMENTS

| | | | | |
|---|---|---|---|---|
| 2017/0182469 | A1* | 6/2017 | Mochizuki | B01D 71/64 |
| 2017/0361007 | A1* | 12/2017 | Roy | B01D 53/228 |
| 2018/0272291 | A1* | 9/2018 | Sawada | B32B 27/281 |
| 2018/0272292 | A1* | 9/2018 | Mochizuki | B01D 69/12 |
| 2021/0114903 | A1* | 4/2021 | Ishii | B32B 3/12 |

FOREIGN PATENT DOCUMENTS

| | | |
|---|---|---|
| JP | 2013-49049 | 3/2013 |
| JP | 2015-66484 | 4/2015 |
| JP | 2015-100778 | 6/2015 |
| JP | 2015-167875 | 9/2015 |
| JP | 2016-10761 | 1/2016 |
| JP | 2016-137484 | 8/2016 |

OTHER PUBLICATIONS

Tilahun et al., "Performance of polydimethylsiloxane membrane contactor process for selective hydrogen sulfide removal from biogas", Waste Management, 2017, vol. 61, pp. 250-257, XP055752756.
Extended European Search Report dated Nov. 30, 2020 in European Patent Application No. 18848237.6.
International Search Report dated Oct. 23, 2018 in International (PCT) Application No. PCT/JP2018/029302.

* cited by examiner

GAS SEPARATION METHOD AND GAS SEPARATION MEMBRANE

TECHNICAL FIELD

The present invention relates to a gas separation method and a gas separation membrane.

BACKGROUND ART

Conventionally, a gas separation method using a gas separation membrane has been employed for the purpose of increasing or reducing the concentration of a specific gas in various mixed gases. For example, a membrane made of polyimide resin having a specific structure has been proposed as a gas separation membrane applicable to the gas separation process by means of gas separation membrane, which uses the pressure generated by the flow of natural gas (in piping) as the driving force for separating a gas (see Patent Document 1).

Patent Document 1: Japanese Unexamined Patent Application, Publication No. 2016-137484

DISCLOSURE OF THE INVENTION

Problems to be Solved by the Invention

However, a method of satisfactorily separating a slight amount of the components in a mixed gas (under mild conditions in which the pressure difference between both sides of the gas separation membranes is 1 atmosphere or less), has not been sufficiently studied in the use of air conditioners and the like.

The present invention has been made in view of the above problem, and the object of the present invention is to provide a gas separation method which is capable of satisfactorily separating a slight amount of a component in a mixed gas under mild conditions in which the pressure difference between both sides of the gas separation membrane is 1 atmosphere or less; and a gas separation membrane which can be used suitably in this gas separation method.

Means for Solving the Problems

The present inventors have found that in a gas separation method allowing the selective permeation of a specific gas (A) from a mixed gas which contains the specific gas (A) at a concentration of 1000 ppm by mass or less and which uses a gas separation membrane, when a very thin gas separation membrane having a film thickness of 1 μm or less is used, the gas (A) can be satisfactorily separated even under mild conditions where the pressure difference between both sides of the gas separation membrane is 1 atmosphere or less, and the present inventors have completed the present invention, The first aspect of the present invention is a gas separation method of allowing the selective permeation of a specific gas (A) from a mixed gas using a gas separation membrane, the method including feeding the mixed gas to one side of the aforementioned gas separation membrane, wherein, the gas separation membrane has a film thickness of 1 μm or less, the concentration of the gas (A) in the mixed gas is 10000 ppm by mass or less, and the selective permeation of the gas (A) with the gas separation membrane is carried out under conditions wherein the pressure difference between both sides of the gas separation membrane is 1 atmosphere or less.

The second aspect of the present invention is a gas separation membrane which is used for reducing the concentration of a gas (A) in a mixed gas by allowing selective permeation through the gas separation membrane, where the concentration of the gas (A) in the mixed gas is 10000 ppm by mass or less, the selective permeation of the gas (A) with the gas separation membrane is carried out under conditions where the pressure difference between both sides of the gas separation membrane is 1 atmosphere or less, and the gas separation membrane is made of a polymer having a film thickness of 1 μm or less.

Effects of the Invention

The present invention can provide a gas separation method which is capable of satisfactorily separating a slight amount of a component in a mixed gas under mild conditions (where the pressure difference between both sides of the gas separation membrane is 1 atmosphere or less), and a gas separation membrane which can be suitably used in the gas separation method.

PREFERRED MODE FOR CARRYING OUT THE INVENTION

《Gas Separation Method》

The gas separation method is a method for separating a gas by allowing selective permeation of a specific gas (A) from a mixed gas using a gas separation membrane. Such a gas separation method includes feeding the mixed gas to one side of the gas separation membrane. A thin membrane having a film thickness of 1 μm or less is used as the gas separation membrane, Furthermore, the concentration of the gas (A) in the mixed gas is 10000 ppm by mass or less. In the gas separation method, the selective permeation of the gas (A) with the gas separation membrane is carried out under conditions where the pressure difference between both sides of the gas separation membrane is 1 atmosphere or less. The pressure difference between both sides of the gas separation membrane may be 0.5 atmosphere or less, or may be 0.01 atmosphere or less.

When a mixed gas including a slight amount, (such as 10000 ppm by mass or less), of a gas (A) permeates a gas separation membrane according to the above conditions, the gas (A) selectively permeates the gas separation membrane, so that the concentration of the gas (A) in the mixed gas after permeation can be increased. Furthermore, the concentration of the mixed gas that has not permeated the gas separation membrane can be decreased. The concentration of the gas (A) in, the mixed gas may be 5000 ppm by mass or less, or may be 3000 ppm by mass or less, or may be 2000 ppm by mass or less, or may be 1000 ppm by mass or less.

The present inventors have found that when using a gas separation membrane and allowing a specific gas (A) to selectively permeate from a mixed gas containing the gas (A) at a low concentration, (10000 ppm by mass or less) when the thickness of the film of the gas separation membrane is within the range of 1 μm or less, the thinner the film, the more significantly the gas permeability (GPU) of the specific gas (A) increases, and the present inventors have completed the present invention.

The increase in gas permeability (GPU) of the specific gas (A) due to the decrease in film thickness surpasses proportional and inverse proportional relationships, and is approximated by means of logarithmic function on the coordinate plane where the ordinate is the gas permeability (GPU) of the gas (A), and the abscissa is the film thickness.

Oxygen and carbon dioxide are preferable as the gas (A) included in the mixed gas, because the gas permeability (GPU) can be easily adjusted by adjusting the film thickness of the gas separation membrane, as well as the fact that there is a need for air conditioning in offices/hospitals/factories/ homes, and because there is a need to increase the carbon dioxide concentration in the air as a countermeasure against global warming. Hydrogen gas is also preferable as the gas (A) because of the need to purify or collect fuel gas to be used as fuel batteries. Because there is a need to collect noble gases such as He to be used the manufacturing processes of industries such as the semiconductor manufacturing industry, as well as in analysis, cooling, or the like, the above-mentioned gas separation method can be applied to the separation and collection of noble gases.

Note here that "gas separation" within the scope of the specification and claims according to the present application is not limited to the perfect separation of a plurality of gas components by means of a mixed gas containing a plurality of gas components permeating the gas separation membrane. "Gas separation" in the specification and claims according to the present application means that a mixed gas containing a plurality of gas components permeates a gas separation membrane, bringing about a change in composition in a mixed gas at the feed side before permeation through the gas separation membrane, and a mixed gas at the permeate side after permeation of the gas separation membrane. In other words, the concentration of a specific gas (A) may be lower in the mixed gas at the feed side before permeation of the gas separation membrane, than in the mixed gas before separation. Furthermore, in the mixed gas on the permeate side after permeation through the gas separation membrane, the concentration of the specific gas (A) may be higher than the concentration of the specific gas (A) in the mixed gas before separation.

<Gas Separation Membrane>

A gas separation membrane is a flat membrane having a film thickness of 1 μm or less. It is preferable that the gas separation membrane usually does not have a through-hole with an opening diameter of 1 nm or more, in order to prevent gas separation performance from deteriorating due to the short pass of a mixed gas. The film thickness of the gas separation membrane is not particularly limited, and is appropriately determined after taking into consideration the gas permeability (GPU) of a gas (A). The film thickness of the gas separation membrane is typically preferably 1000 nm or less, more preferably 500 nm or less, and particularly preferably 200 nm or less. The lower limit of the film thickness of the gas separation membrane is preferably 10 nm or more, more preferably 20 nm or more, further preferably 50 nm or more, and particularly preferably 100 nm or more, from the viewpoint of strength of the gas separation membrane The film thickness of the gas separation membrane can be determined by a method including, for example, the following 1) to 6)
1) Preparing n samples of membranes, made of the same materials as those of the gas separation membrane and having different film thicknesses each of which is more than 0.01 μm and less than 1 μm,
2) Measuring the gas permeability (GPU) of the gas (A) for n samples under the same conditions as those when the gas (A) is separated from the mixed gas, using the gas separation membrane,
3) Plotting the film thicknesses and the gas permeability (GPU) of the gas (A) obtained by measurement of the gas permeability of n samples on the coordinate plane, with the ordinate indicating the gas permeability and the abscissa indicating the film thickness,
4) Carrying out a logarithmic approximation based on the n coordinate data about the samples plotted on the coordinate plane, and obtaining an approximate line of the relation between the film thickness and the gas permeability of the gas (A),
5) Obtaining the film thickness X, wherein the gas permeability in the obtained approximate line is Y (GPU), when the desired gas permeability of the gas (A) is Y (GPU) in predetermined separation conditions, and
6) Determining the film thickness of the gas separation membrane in a range of 1 μm or less and X or less.

It is preferable that the above-mentioned gas separation membrane has a property meaning that a concentration of a gas (A) in a mixed gas after treatment with a gas separation membrane can be decreased with the decrease of the feed amount or flow rate of a mixed gas to the gas separation membrane. When the feed amount or the flow rate of the mixed gas to the gas separation membrane is decreased, retention time of the mixed gas in the vicinity of the gas separation membrane is increased. Thus, contact time between the gas separation membrane and the mixed gas to be separated is prolonged, As a result, the amount of the gas (A) permeating the gas separation membrane is increased, which may decrease the concentration of the gas (A) in the mixed gas treated with the gas separation membrane.

Note here that as mentioned below, it is preferable that the gas separation membrane is used as a laminate including a gas separation membrane and a support membrane. Examples of the support membrane include mesh or nonwoven fabric, a porous membrane having a large number of pores inside thereof, for example, a sponge, and a porous membrane having a large number of through-holes in a plane thereof. Among them, a porous membrane is preferable for us.

Furthermore, when the gas separation membrane is used as a laminate including a gas separation membrane and a support. membrane, it is preferable that the gas separation membrane has a self-supporting property, meaning it is capable of existing as a flat membrane even on a pore portion in the support membrane on a contact surface with the support membrane. With this self-supporting property of the gas separation membrane, when the gas separation membrane is used as a laminate including a gas separation membrane and a support membrane, the desired gas separation performance is exhibited.

The material of the gas separation membrane is not particularly limited. The material of the gas separation membrane is preferably a polymer, in view of ease of processing. Polymer is appropriately selected according to the types of gases which permeate a gas separation membrane.. Suitable examples of polymer include: silicone resin, polyamic acid, polyimide, polybenzoxazole, epoxy resin, acrylic resin, etc. Furthermore, an isoprene-butadiene-styrene copolymer, a hydrogenated product of an isoprene-butadiene-styrene copolymer, a butadiene-styrene copolymer, a hydrogenated product of a butadiene-styrene copolymer, an isoprene-styrene copolymer, a hydrogenated product of an isoprene-styrene copolymer, an ethylene-propylene-styrene copolymer, a propylene-styrene copolymer, an ethylene-styrene copolymer, an ethylene-propylene-1-butene-styrene copolymer, and styrene polymers such as polystyrene, are also preferable. Furthermore, cyclic olefin-based copolymer such as an ethylene-norbornene copolymer, a propylene-norbornene copolymer, an ethylene-tetracyclododecene copolymer, a propylene-tetracyclododecene copolymer, an ethylene-propylene-norbornene copolymer, and an ethylene-propylene-tetracyclododecene copolymer are also preferable. When the polymers are copolymers, they may be a random copolymer, or may be a block copolymer. Furthermore, when the polymer is a block copolymer including a unit derived from styrene, a block copolymer having a unit of the block derived from styrene on both ends of a molecular chain is preferable. Furthermore, the above-mentioned preferable polymers may have hydroxyl groups at both ends or on one end of the molecular chain.

Among the above-mentioned polymers, from the viewpoint of excellent gas separation performance, ease of formation of a gas separation membrane with the desired film thickness, mechanical strength of the gas separation membrane, and more, a silicone resin is preferable. Polyorganosiloxanes such as polydimethylsiloxane, polyphenylmethylsiloxane, and polydiphenyl siloxane are preferable as the silicone resin, and polydimethylsiloxane is even more preferable.

When the gas separation membrane is used as a laminate with a support membrane, an area of the main surface of the gas separation membrane and an area of a main surface of the laminate are preferably equal to each other. When the use of the laminate is not impaired, an area of the main surface of the gas separation membrane and an area of the main surface of the laminate may be different from each other.

<Method of Producing Gas Separation Membrane>

The method of producing the gas separation membrane is not particularly limited as long as it is a method capable of producing a gas separation membrane with the desired film thickness using the desired material, Examples of preferable methods include forming a sacrificed film between a substrate and a gas separation membrane, as described below. The sacrificed film is a membrane that is soluble in a liquid that does not dissolve the substrate and the gas separation membrane. By dissolving only the sacrificed film in a liquid, a very thin gas separation membrane can be peeled off from the substrate without causing damage.

Firstly, a sacrificed film is formed on a substrate made of silicone, glass, polyethylene terephthalate, etc. There is no particular limitation on the method of forming the sacrificial film, but a method in which a coating solution for forming a sacrificial film is applied on the substrate is preferable, Examples of the method of applying the material for formation of the liquid sacrificial film on a substrate include a method using a contact transfer-type coating device such as a roll coater, a reverse coater, or a bar coater, or a non-contact-type coating device such as a spinner (rotary coating device) or a curtain flow coater. The coating film formed after application is dried using a method such as heating in order to form a sacrificial film. There is no particular limitation on the thickness of the sacrificial film, and the thickness is preferably 0.1 to 100 μm, and more preferably 0.5 to 50 μm, from the viewpoint of rapidly dissolving the sacrificial film.

Examples of the material of the sacrificial film include polyvinyl alcohol resin, dextrin, gelatin, glue, casein, serac, gum arabic, starch, protein, polyacrylic acid amide, sodium polyacylate, polyvinyl methyl ether, copolymer of methyl vinyl ether with maleic anhydride, copolymer of vinyl acetate with itaconic acid, polyvinylpyrrolidone, acetyl cellulose, hydroxyethyl cellulose, sodium alginate, and such, Of these materials, a plurality of materials which are soluble in the same kind of liquid may be used in combination. From the viewpoint of strength and flexibility of the sacrificial film, the material of the sacrificial film may contain rubber components such as mannan, xanthan gum, and guar gum.

The coating solution for the formation of a sacrificial film is prepared by dissolving the material of the sacrificial film in a liquid which can dissolve the sacrificial film. There is no particular limitation on the liquid which dissolves the sacrificial film, as long as it is a liquid which does not cause deterioration of or dissolve the substrate and the gas separation membrane. Examples of the liquid for dissolving the sacrificial film include water, an aqueous acidic or basic solution, an organic solvent, and an aqueous solution of the organic solvent and of these liquid, water, an aqueous acidic or basic solution, and an organic solvent are preferable.

Suitable examples of liquids which dissolve the material of the sacrificial film material include organic solvents. Examples of organic solvents include lactones, ketones, polyhydric alcohols, organic solvents of cyclic ethers and esters, aromatic organic solvents, alcohol-based solvents, terpene-based solvents, hydrocarbon-based solvent, petroleum-based solvents, and such. These organic solvents may be used alone, or plural kinds thereof may be used in combination, Examples of organic solvents of lactones include γ-butyrolactone, and such, Examples of organic solvents of ketones include acetone, methyl ethyl ketone, cyclopentanone, cyclohexanone, methyl-n-pentyl ketone, methyl isopentyl ketone, 2-heptanone, and such. Examples of organic solvents of polyhydric alcohols include ethylene glycol, diethylene glycol, propylene glycol, dipropylene glycol, and such, Organic solvents of polyhydric alcohols may be derivatives of polyhydric alcohols, and examples thereof include: compounds having an ester bond (for example, ethylene glycol monoacetate, diethylene glycol monoacetate, propylene glycol monoacetate, or dipropylene glycol monoacetate), compounds having an ether bond (for example, monoalkyl ether or monophenyl ether, such as monomethyl ether, monoethyl ether, monopropyl ether, or monobutyl ether), (for example, the above-mentioned polyhydric alcohols or the above-mentioned compounds having an ester bond), and such, Of these, propylene glycol monomethyl ether acetate (PGMEA) and propylene glycol monomethyl ether (PGME) are preferable.

Examples of organic solvents of cyclic ethers include dioxane, and such. Examples of organic solvents of esters include ethyl lactate, ethyl lactate (EL), methyl acetate, ethyl acetate, butyl acetate, methyl pyruvate, ethyl pyruvate, methyl methoxypropionate, ethyl ethoxypropionate, and such.

Examples of aromatic organic solvents include anisole, ethyl benzyl ether, cresyl methyl ether, diphenyl ether, dibenzyl ether, phenetole, butyl phenyl ether, ethylbenzene, diethylbenzene, pentylbenzene, isopropylbenzene, toluene, xylene, cymene, mesitylene, and such.

There is no particular limitation on the alcohol-based solvent, as long as it can dissolve the sacrificial film, and examples thereof include methanol, ethanol, and such.

Examples of terpene-based solvents include geraniol, nerol, linalool, citral, citronellol, menthol, isomenthol, neomenthol, α-terpineol, β-terpineol, γ-terpineol, terpinen-1-ol, terpinen-4-ol, dihydroterpinyl acetate, 1,4-cineole, 1,8-cineole, borneol, carvone, ionone, thujone, camphor, and such.

Examples of hydrocarbon-based solvents include a linear, branched, or cyclic hydrocarbon Examples of hydrocarbon-based solvents include linear hydrocarbons having 3 to 15 carbon atoms, such as hexane, heptane, octane, nonane, decane, undecane, dodecane, and tridecane; branched hydrocarbons having 4 to 15 carbon atoms, such as methyloctane;

and cyclic hydrocarbons such as p-menthane, o-menthane, m-menthane, diphenylmenthane, 1,4-terpin, 1,8-terpin, bornane, norbornane, pinane, thujane, carane, longifolene, α-terpinene, β-terpinene, γ-terpinene, α-pinene, β-pinene, α-thujone, and β-thujone.

Examples of petroleum-based solvents include cyclohexane, cycloheptane, cyclooctane, naphthalene, decahydronaphthalene (decalin), tetrahydronaphthalene (tetralin), and such.

Next, a solution which contains the material of the gas separation membrane is applied to the surface of the sacrificed film, and then, the solvent is removed from the coating film, thereby forming a gas separation membrane on the sacrificed film. Then, by dissolving the sacrificed film in a liquid in which a sacrificed film is soluble, the gas separation membrane can be peeled off and recovered from the substrate.

<Laminate>

The laminate includes the above-described gas separation membrane and a support membrane that supports the gas separation membrane. The support membrane is preferably a porous membrane made of a porous material. By using the porous membrane as the support membrane, the very thin gas separation membrane is supported by the support membrane so that the gas separation membrane is not broken, and the mixed gas can be circulated on the inside of the laminate so that the mixed gas reaches the gas separation membrane.

Hereinafter, the porous membrane to be used as the support membrane will be described The material of the porous membrane is not particularly limited, and it may be an organic material or an inorganic material, From the viewpoint of ease of formation of a porous membrane with a desired pore diameter or percentage of voids, the material of the porous membrane is preferably an organic material. Such organic materials are typically a polymer. Examples of polymers include polyacetal, polyamide, polycarbonate, polyester (polybutylene terephthalate, polyethylene terephthalate, polyarylate, and such), FR-AS resin, FR-ABS resin, AS resin, ABS resin, polyphenylene oxide, polyphenylene sulfide, polysulfone, polyethersulfone, polyether ether ketone, fluorine resin (polytetrafluoroethylene, polyvinylidene fluoride, and such), polyimide, polyamide imide, polyamide his maleimide, polyether imide, poly benzo oxazole, poly benzo thiazole, poly benzimidazole, silicone resin, BT resin, polymethylpentene, ultra-high molecular weight polyethylene, FR-polypropylene, (meth)acrylic resin (polymethyl methacrylate, and such), and polystyrene, and such. Among the polymers, porous membrane which is thermally or chemically stable, and has excellent mechanical strength, polyvinylidene fluoride, polyethersulfone, polyimide, and polyamide imide are preferable. Note here that as the material of the porous membrane, a mixture of two or more resins may be used.

A method for producing a porous membrane is not particularly limited. Suitable examples of porous membrane include a porous membrane described in, for example, International Publication WO2014/175011, Japanese Patent Application Unexamined Publication No. 2014-214767.

<Method for Producing Laminate>

A method for producing a laminate is not particularly limited as long as it is a method capable of laminating the gas separation membrane and the support membrane without causing damage. For example, when a gas separation membrane is produced by a method using the above-described sacrificed film, by dissolving the sacrificed film in a liquid in which the sacrificed film is soluble, thus enabling the gas separation membrane liberated from the substrate to be scooped up onto the support membrane, and then to be dried. Thus, a support can be produced.

<Gas Separation Method>

A gas separation method is not particularly limited as long as it is a gas separation method using the above-described gas separation membrane, and the mixed gas to be separated includes the gas (A) having a concentration of 10000 ppm by mass or less, and allowing selective permeation of the specific gas (A) under conditions where a pressure difference between both sides of the gas separation membrane is 1 atmosphere or less.

In such a gas separation method, well-known gas separation device for performing gas separation with the gas separation membrane can be used without particular limitation.

EXAMPLES

Hereinafter, the present invention is described in more detail by way of Examples, but the present invention is not limited to these Examples, Example 1

A laminate including a gas separation membrane and a support membrane was produced according to the following method, Firstly, 15% by mass ethanol solution of polyhydroxystyrene was applied on a glass substrate using a spin coater. Then, the coating film was dried to form a 1 μm-thick sacrificed film made of polyhydroxystyrene. On the formed sacrificed film, 2.3% by mass n-hexane solution of polydimethylsiloxane (SYLGARD (registered trademark) 184SILICONE ELASTOMER KIT manufactured by Dow Corning Corp,) was applied using a spin coater. Then, the coating film was dried to form a gas separation membrane having a film thickness of 150 nm. Then, a laminate including the glass substrate, the sacrificed film, and the gas separation membrane was immersed in ethanol. The sacrificial membrane was dissolved in ethanol, so that the gas separation membrane was peeled off from the glass substrate. The gas separation membrane liberated in ethanol was scooped up onto a porous polyimide membrane as the support membrane and dried to obtain a laminate including the gas separation membrane and the support membrane, As the support membrane, a polyimide porous membrane manufactured by TOKYO OHKA KOGYO CO., LTD., which was made of polyimide resin derived from 3,3',4,4'-Biphenyltetracarboxylic acid dianhydride and 4,4'-diaminodiphenyl ether and had a porosity of 70% by volume, was used, For the gas separation membrane obtained as a laminate, carbon dioxide, nitrogen, hydrogen, helium, and argon were fed from one side of the gas separation membrane, and the flow rate value (ml/min) at the standard temperature and standard atmospheric pressure of permeating gas was measured using a gas permeability measuring device (high precision membrane flow meter SF-2U, manufactured by Horiba, Ltd.), At this time, a pressure difference between both sides of the gas separation membrane was 0.1 to 1 atmosphere, and the gas permeation area was 0.785 cm². Gas permeability (GPU) was calculated from the obtained flow rate values. Note here that the GPU was calculated by the following generally used formula.

$$\text{Gas permeability (GPU)} = 7.5 \times 10^{-12} \times m^3 \text{ (STP)}/m^2 \times Pa \times s$$

As a result, the gas permeability of carbon dioxide was 6572 GPU. The gas permeability of nitrogen was 660 GPU. The gas permeability of hydrogen was 1786 GPU. The gas permeability of helium was 1458 GPU. The gas permeability of argon was 1464 CPU. Permeation selectivity of carbon dioxide and nitrogen was carbon dioxide/nitrogen of 10.0. Permeation selectivity of carbon dioxide and hydrogen was carbon dioxide/hydrogen of 3.7. Furthermore, as the permeation selectivity of gas other than carbon dioxide, helium/nitrogen was 1.6, argon/nitrogen was 2.0, and hydrogen/nitrogen was 2.7. Furthermore, a mixed gas was continued to be fed to the gas separation membrane obtained as a laminate for 4000 hours, and then the gas permeability of each gas was measured. As a result, the gas permeability of carbon dioxide was not largely decreased, and the permeation selectivity of carbon dioxide and nitrogen and the permeation selectivity of carbon dioxide and hydrogen were hardly changed. In other words, the gas separation membrane obtained in Example 1 exhibited stable gas separation performance for a long time.

Examples 2 and 3, and Comparative Example 1

Gas separation membranes as a laminate were respectively obtained in the same manner as in Example 1 except that film thicknesses of the gas separation membranes were changed to film thicknesses described in Table 1. For the obtained gas separation membranes, the gas permeability of carbon dioxide and the permeation selectivity of carbon dioxide and nitrogen were measured by the same method as in Example 1, Each gas permeability of carbon dioxide is shown in Table 1. Furthermore, the permeation selectivity of carbon dioxide and nitrogen was about 10.0 as carbon dioxide/nitrogen, which was substantially the same value as in the gas separation membranes of Examples 2 to 4, and Comparative Examples 1.

TABLE 1

|  | Example 1 | Example 2 | Example 3 | Comparative Example 1 |
|---|---|---|---|---|
| Film thickness | 150 nm (0.15 μm) | 700 nm (0.7 μm) | 1.0 μm | 4.4 μm |
| Gas permeability of carbon dioxide (GPU) | 3213 | 1779 | 1308 | 951 |

From Table 1, it is shown that as the film thickness becomes thinner in a range of the film thickness of 1.0 μm or less, the gas permeability of carbon dioxide rises sharply. Furthermore, when the film thickness is more than 1.0 μm, the gas permeability of carbon dioxide is low.

Example 4

A laminate obtained in Example 1 was fixed in a gas permeation test cell such that space inside the gas permeation test cell was partitioned into two spaces substantially equally. Note here that the laminate was fixed to the gas permeation test cell such that the gas separation membrane was located in the upstream side in the feeding direction of the mixed gas.
Conditions for the gas permeation test cell are as follows. The gas permeation area is an area in which the mixed gas fed to the laminate can be brought into contact with the laminate,
Gas permeation part area: 0,785 cm²
Space volume in cell: 0.163 cm³
The gas permeation test cell was provided with a gas feeding passage for feeding a feed gas as a mixed gas to be separated, and a residual gas collecting passage for collecting a residual gas, each communicating with space in the upstream side in the feeding direction of the mixed gas relative to the laminate inside the gas permeation test cell. Furthermore, the gas permeation test cell was provided with a helium gas feed amount, and a permeate gas collecting passage, each communicating with space in the downstream side in the feeding direction of the mixed gas relative to the laminate inside the gas permeation test cell. From the residual gas collecting passage, of mixed gases fed to the laminate, remaining gas that has not permeated the laminate is collected. From the helium gas feeding passage, a helium gas is fed for the purpose of sweeping the gas that has permeated the membrane to a gas detector. From the permeate gas collecting passage, a mix gas that has permeated the laminate is collected.

As the feed gas, a nitrogen gas including 1000 mass ppm of carbon dioxide was used. During the test, a helium gas was always fed from the helium. gas feeding passage at a flow rate of 100 sccm. The feed gas was fed under conditions of 100 seem, 50 sccm, and 10 sccm, and a separation test of the mixed gas was carried out. A differential pressure between both sides of the laminate during separation of the mixed gas was 0.001 atmosphere.

A carbon dioxide concentration of a residual gas collected when the mixed gas was separated was measured. From the carbon dioxide concentration of the feed gas, the removal rate of carbon dioxide in the residual gas that has not permeated the laminate at each flow rate was calculated. The removal rate of carbon dioxide at each flow rate is shown in Table 2.

TABLE 2

| Flow rate of mixed gas (sccm) | 100 | 50 | 10 |
|---|---|---|---|
| Removal rate of carbon dioxide (%) | 13 | 21 | 45 |

From Table 2, it is shown that carbon dioxide can be desirably removed from nitrogen by carrying out separation under conditions where a pressure difference between both sides of the gas separation membrane is 1 atmosphere or less using a laminate including a gas separation membrane having a film thickness of 1 μm or less. Furthermore, it is shown that the removal rate of carbon dioxide is higher as the flow rate of the mixed gas fed to the laminate is lower, Comparative Example 2

A separation test of a mixed gas was carried out in the same manner as in Example 4 except that a laminate obtained in Comparative Example 1 and including a gas separation membrane having a film thickness of 4.4 μm was used instead of the laminate obtained in Example 1, and that the mixed gas was fed at the flow rate of 100 sccm, 80 sccm, 60 sccm, 40 sccm, 20 sccm, and 10 sccm. As a result, in the test at all the flow rates, the carbon dioxide concentration in the permeate gas was substantially equal to the carbon dioxide concentration in the feed gas. Naturally, even if the flow rate was decreased, it was not possible to reduce the carbon dioxide concentration in the residual gas, Examples 5 to 7, and Comparative Example 3

A separation test of a mixed gas was carried out in the same manner as in Example 4 except that the flow rate of the feed gas was 100 scc, and the carbon dioxide concentration in the feed gas was changed to the concentrations described in Table 3. The carbon dioxide concentration was measured for the permeate gas collected when the separation of the mixed gas was carried out. From the carbon dioxide concentration in the feed gas (ppm by mass), and the carbon dioxide concentration in the permeate gas (ppm by mass), the carbon dioxide concentration rate (carbon dioxide concentration in the permeate gas (ppm by mass)/ carbon dioxide concentration in the feed gas (ppm by mass) in the permeate gas that had permeated the laminate was calculated. The removal rate of carbon dioxide for each flow rate is shown in Table 3.

TABLE 3

|  | Example 5 | Example 6 | Example 7 | Comparative Example 3 |
|---|---|---|---|---|
| Carbon dioxide concentration in feed gas (ppm by mass) | 400 | 500 | 1000 | 50000 |
| Carbon dioxide concentration rate | 6.1 times | 6.9 times | 6.3 times | 5.2 times |

From Table 3, it is shown that carbon dioxide can be desirably removed from the mixed gas having a carbon dioxide concentration of 1000 ppm by mass or Jess by carrying out separation under conditions where a pressure difference between both sides of the gas separation membrane is 1 atmosphere or less using a laminate including a gas separation membrane having a film thickness of 1 μm or less.

The invention claimed is:

1. A gas separation method of allowing selective permeation of a specific gas (A) from a mixed gas using a gas separation membrane,
the method comprising feeding the mixed gas to one side of the gas separation membrane,
wherein the gas separation membrane does not comprise a through-hole with an opening diameter of 1 nm or more,
wherein the gas separation membrane has a film thickness of 1 μm or less,
wherein a concentration of the gas (A) in the mixed gas is 10000 ppm by mass or less, and
wherein the selective permeation of the gas (A) with the gas separation membrane is carried out under conditions where a pressure difference between both sides of the gas separation membrane is 1 atmosphere or less.

2. The method according to claim 1, wherein the gas separation membrane is laminated to a porous support membrane, and wherein the gas separation membrane is flat even over pores in the porous support membrane.

3. The method according to claim 1, wherein the gas separation membrane is formed of a polymer.

4. The method according to claim 3, wherein the polymer is polydimethylsiloxane not comprising at least one selected from a cyclic olefin-based polymer and copolymer.

5. The method according to claim 1, wherein the gas (A) is carbon dioxide.

6. A gas separation membrane, which is used for reducing a concentration of a specific gas (A) in a mixed gas by allowing selective permeation through the gas separation membrane,
wherein a concentration of the gas (A) in the mixed gas is 10000 ppm by mass or less,
wherein the selective permeation of the gas (A) with the gas separation membrane is carried out under conditions where a pressure difference between both sides of the gas separation membrane is 1 atmosphere or less,
wherein the gas separation member does not comprise a through-hole with an opening diameter of 1 nm or more, and
wherein the membrane has a film thickness of 1 μm or less, and is made of a polymer.

7. The separation membrane according to claim 6, wherein the gas separation membrane is laminated to a porous support membrane, and wherein the gas separation membrane is flat even over pores in the porous support membrane.

8. The gas separation membrane according to claim 6, wherein the polymer is polydimethylsiloxane not comprising at least one selected from a cyclic olefin-based polymer and copolymer.

9. The gas separation membrane according to claim 6, wherein the gas (A) is carbon dioxide.

* * * * *